UNITED STATES PATENT OFFICE.

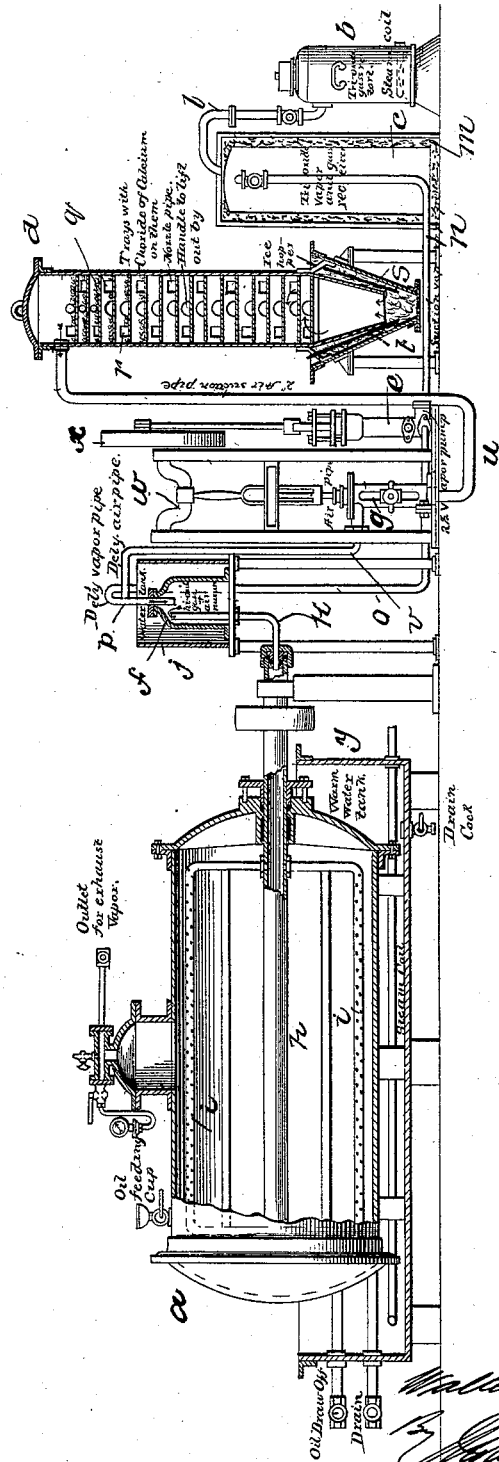

WALTER MILLS, OF LONDON, ENGLAND, ASSIGNOR OF ONE-HALF TO HOWARD OVIATT, OF NEW YORK, N. Y.

PROCESS OF PURIFYING OILS.

SPECIFICATION forming part of Letters Patent No. 532,682, dated January 15, 1895.

Application filed December 11, 1891. Renewed April 21, 1894. Serial No. 508,528. (No model.) Patented in England October 23, 1891, No. 18,224.

*To all whom it may concern:*

Be it known that I, WALTER MILLS, a subject of the Queen of Great Britain, residing at London, England, have invented certain new and useful Improvements in Purifying Oils and Fats, (for which I have obtained British Patent No. 18,224, dated October 23, 1891;) and I do hereby declare that the following is a full, clear, and exact description of the invention, which will enable others skilled in the art to which it appertains to make and use the same.

My invention relates to a process for purifying oils and fats and is based upon a discovery which I have made, namely, that if sulphuric tri-oxide, at a suitable temperature, say 120° to 130° Fahrenheit, be brought into contact with a fat or oil, also at a suitable temperature, the sulphuric tri-oxide is decomposed into its constituent gases, namely, sulphurous di-oxide and oxygen in accordance with the following equation: $2SO_3 = 2SO_2 + O_2$. The sulphurous di-oxide and the oxygen being thus disengaged in their nascent state immediately attack and destroy the impurities in the fat or oil. The exact chemical reaction that takes place, by which the trioxide is decomposed into $SO_2$ and $O_2$ cannot be definitely determined, owing to the complex and intricate natures of the compounds they are brought in contact with, but the general rule is that trioxides are decomposed by contact with organic substances, and actual operation has proved it to be the case in my process. The impurities before referred to vary according to the constituents of the oil or fat, but they may be generally described as substances containing the radical $CnH_{2n}+1$ in a more or less advanced state of oxidation, and in some cases hydric sulphide ($H_2S$) is present. These impurities are also of a very complex and intricate character, but I find that the sulphuric trioxide effectually destroys or reduces them. This action is so energetic that in most cases it is necessary to dilute the sulphuric tri-oxide with a neutral gas before using it.

In the accompanying drawings I have shown an apparatus for carrying out my process.

Referring, however, to said drawings, *a* is the vessel which I call the "mixer" in which the fats or oils to be treated are placed.

*b* is the retort in which sulphuric trioxide is introduced and heated until it assumes a gaseous form or gives off gaseous sulphuric trioxide.

*c* is a receptacle for the gaseous sulphuric trioxide produced in the retort, *b*.

*d* is the apparatus in which the atmospheric air is dried and *e* is a pump in which said air is heated by compression.

*f* is a vessel in which the gas and hot dry air are forced by the pumps *g* and *e* respectively, and in which they become united previously to their introduction into the mixer *a*.

The mixer *a* is a cylindrical vessel constructed of iron, capable of supporting a pressure of about sixty pounds to the square inch. A hollow shaft *h*, so arranged as to revolve freely on its bearings, passes through the axis of this cylinder. Communicating with the interior of this shaft and revolving therewith are perforated iron pipes *i*, *i*, through which the mixture of sulphuric trioxide gas and atmospheric air is distributed freely into the contents of the mixer.

The vessel *f* is fixed in a tank *j* and has a pipe *k* therein opening upward and communicating with the hollow shaft *h* as shown in the drawings. The object of placing the vessel *f* in a tank is to enable the mixed gas and air to be kept at any desired temperature by filling the tank with steam, water or other fluid.

The retort *b* is heated by means of a stove or steam coil so as to heat the solid sulphuric trioxide placed therein to above a temperature of 120° Fahrenheit at which temperature gaseous sulphuric trioxide is produced which passes out through a pipe *l* into the receptacle or holder *c* which is packed or lagged on the outside with suitable non-conducting material *m*. From the gas holder *c* the trioxide gas is drawn by the pump *g* as required, through the suction pipe *n* and delivered by said pump, through the delivery pipe *o* and through a pipe *p* into the vessel *f*.

The apparatus *d* for drying the atmospheric air is constructed with a number of shelves or trays $q$ on which is placed a substance such as chloride of calcium, which will readily absorb moisture. The trays $q$ are provided with holes fitted with nozzles $r$ so as to allow free circulation of the atmospheric air through or over the substance placed upon the trays $q$. The vessel $d$ is entirely closed except at its base which is of conical shape and is inserted in a conical shaped vessel or receptacle $s$ containing ice. Tubes $t$ are so fixed between the inner side of the receptacle $s$ and the base of vessel $d$ that air can pass freely down them and enter the said vessel, being cooled in its passage by the ice. The air passes upward in the direction indicated by the arrows and having been freed from moisture passes through the suction pipe $u$ to the compression pump $e$ whereby it is heated and delivered through a pipe $v$ into the same pipe $p$ which receives the sulphuric trioxide gas and discharges them together into the vessel $f$ in which they become intimately mixed before passing off through the pipe $k$, hollow shaft $h$ and perforated pipes $i$ into the fat or oil in the mixer $a$. The diluted sulphuric trioxide is here decomposed into its constituents, sulphurous dioxide and oxygen both of which being in a nascent state bleach, deodorize and purify the fat or oil with which they are brought into contact.

The pumps $g$ and $e$ are actuated by a crank $w$ operated by a pulley $x$ driven from any suitable motor. Suitable valves and stopcocks are provided to regulate the flow of the gaseous sulphuric trioxide and of the atmospheric air and to draw off the contents of the various vessels.

Some oils, such as petroleum, can be treated in a cold state while other oils and fats require to be heated or melted. I prefer, however, in all cases to heat the fat or oil to about 120° Fahrenheit. As it is best to do this while the fat or oil is in the mixer $a$, I provide a tank $y$ around the base of the mixer arranged to be heated by any suitable means.

In practice I find that it is generally advantageous to conduct the operation under a pressure of (but not in any case exceeding) two atmospheres as the action of the tri-oxide is thereby accelerated and a more perfect contact with the sulphuric tri-oxide brought about.

Sulphuric tri-oxide is at ordinary temperatures a solid and it is therefore generally impracticable to use it in that condition although there are cases in which it may be so used. I find that it is best in most cases to melt the fat or oil (if it requires melting) and to bring it to a temperature of about 120° to 130° Fahrenheit in those cases where pressure is not used. The sulphuric tri-oxide is raised to the same temperature, at which temperature it is a gas.

In cases where the tri-oxide requires to be diluted, it may be readily mixed with dry atmospheric air raised to about the same temperature as the gas. In this condition it is readily capable of being brought into contact with the fat or oil by suitable mechanical means.

When the sulphuric tri-oxide has done its work upon the fat or oil this latter substance is largely charged with the products of the decomposition of the sulphuric tri-oxide and with the results of their action upon the fat or oil. These must be removed from the fat or oil in order to render it a commercial article. I effect this in most cases by filtering the fat or oil through animal charcoal which I find is the most advantageous filtering medium both on the ground of economy as well as because of its efficient action. In those cases where the fat or oil readily solidifies the filter-bed which contains the animal charcoal or other filtering medium must be kept at a suitable temperature, say at about 130° Fahrenheit. There are also cases in which the fat or oil is so highly charged with the sulphurous di-oxide, produced by the decomposition of the sulphuric tri-oxide that it is desirable to expose the fat or oil to the action of steam which is best used superheated to a slight degree. In these circumstances the sulphurous di-oxide is readily removed, after which any carbonaceous materials present in the fat or oil may be eliminated by filtration through animal charcoal.

I am aware that sulphuric acid has been used in purifying oils and fats but the operation of sulphuric trioxide as employed by me is essentially different from the action of sulphuric acid. Sulphuric acid when mixed with oils or fats forms substitution products therewith, in most cases entirely altering the nature of the oil or fat treated. Thus cocoa nut-oil so treated becomes harder and darker, whereas sulphuric trioxide has no such action. The trioxide can also be diluted and can also be intimately mixed with the oils and fats. The action of the trioxide consists in oxidizing the complex substance to which oils and fats owe their rancidity and thus alcohols and incipient aldehydes are fully saturated and converted into volatile products having no affinity for the oil or fat. The trioxide also destroys the sulphide of hydrogen whenever present.

The relative amount of sulphuric trioxide and oil varies in the case of every oil, depending upon the quantity of substance in the oil which has to be destroyed or removed. This is a matter that can only be decided by analysis or experiment in each individual case. I may state, however, that in purifying crude green olive oil from 0.2 to 0.4 per cent. of sulphuric trioxide gives excellent results, completely removing every trace of chlorophyel, and converting the impure oil into an ideally pure substance. I have employed as little as 0.1 per cent. with equally good results.

The process is almost instantaneous, as decomposition of the sulphuric trioxide takes place immediately it touches the oil. It will, of course, be some little time before a large quantity of oil can be brought into contact with the trioxide and in order to facilitate this the stirring apparatus was designed. The quantity of air that is mixed with the trioxide vapor depends upon a variety of considerations and can only be decided by observation of the oil that is being purified. In the case e. g. of benzine, no air is required, but crude petroleum oil requires a considerable quantity. This quantity depends upon the facility with which the oil under treatment decomposes the trioxide. A good rough, practical rule is to use such a quantity of air that when mixed with the trioxide vapor the total volume equals the bulk of the oil.

Having now particularly described and ascertained the nature of my said invention and in what manner the same is to be performed, I declare that what I claim is—

1. The process herein described of purifying oils and fats which consists in first vaporizing the solid sulphuric trioxide and then injecting the gas into the oil or fat, substantially as set forth.

2. The process herein described of purifying oils and fats, which consists in first vaporizing the solid sulphuric trioxide, diluting the same with a neutral gas and then injecting the mixture into the oil or fat, substantially as set forth.

WALTER MILLS.

Witnesses:
  G. F. REDFERN,
  JOHN E. BOUSFIELD,
*Of the firm of G. F. Redfern & Co., 4 South Street, Finsbury, London, Patent Agents.*